(12) United States Patent
Mizunashi et al.

(10) Patent No.: US 10,069,985 B2
(45) Date of Patent: Sep. 4, 2018

(54) MANAGING SYSTEM, INTERMEDIATE APPARATUS, AND MANAGING METHOD

(71) Applicants: Ryosuke Mizunashi, Kanagawa (JP);
Satoshi Aoki, Kanagawa (JP);
Yuuichiroh Negishi, Saitama (JP)

(72) Inventors: Ryosuke Mizunashi, Kanagawa (JP);
Satoshi Aoki, Kanagawa (JP);
Yuuichiroh Negishi, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/603,659

(22) Filed: May 24, 2017

(65) Prior Publication Data

US 2017/0346963 A1 Nov. 30, 2017

(30) Foreign Application Priority Data

May 27, 2016 (JP) ................................. 2016-106737
Feb. 20, 2017 (JP) ................................. 2017-029485

(51) Int. Cl.
*G06F 15/00* (2006.01)
*H04N 1/00* (2006.01)
*H04L 29/08* (2006.01)

(52) U.S. Cl.
CPC ..... *H04N 1/00344* (2013.01); *H04L 67/2804* (2013.01); *H04N 1/00244* (2013.01); *H04N 1/00408* (2013.01); *H04N 1/00954* (2013.01); *H04N 2201/0094* (2013.01)

(58) Field of Classification Search
CPC ........... H04N 1/00408; H04N 1/00344; H04N 1/00954; H04N 2201/0094; H04N 1/00244

USPC ........................................................ 358/1.15
See application file for complete search history.

(56) References Cited

U.S. PATENT DOCUMENTS

2004/0148379 A1    7/2004  Ogura
2007/0073863 A1*   3/2007  Motoyama ......... G03G 15/5075
                                                        709/224
2013/0218920 A1*   8/2013  Satoh ................ G06F 17/30386
                                                        707/758

FOREIGN PATENT DOCUMENTS

CN    204272175 U    4/2015
JP    2001-092770    4/2001
JP    2009-296357    12/2009

OTHER PUBLICATIONS

European search report dated Oct. 18, 2017 in connection with corresponding European patent application No. 17169807.9.

* cited by examiner

*Primary Examiner* — Saeid Ebrahimi Dehkord
(74) *Attorney, Agent, or Firm* — Cooper & Dunham LLP

(57) ABSTRACT

A managing system includes a managing apparatus that transfers command information corresponding to a type of the apparatus to the intermediate apparatus and an intermediate apparatus including circuitry that acquires apparatus information from the apparatus in response to the command information transferred by the managing apparatus, and transfers the acquired apparatus information to the managing apparatus.

9 Claims, 14 Drawing Sheets

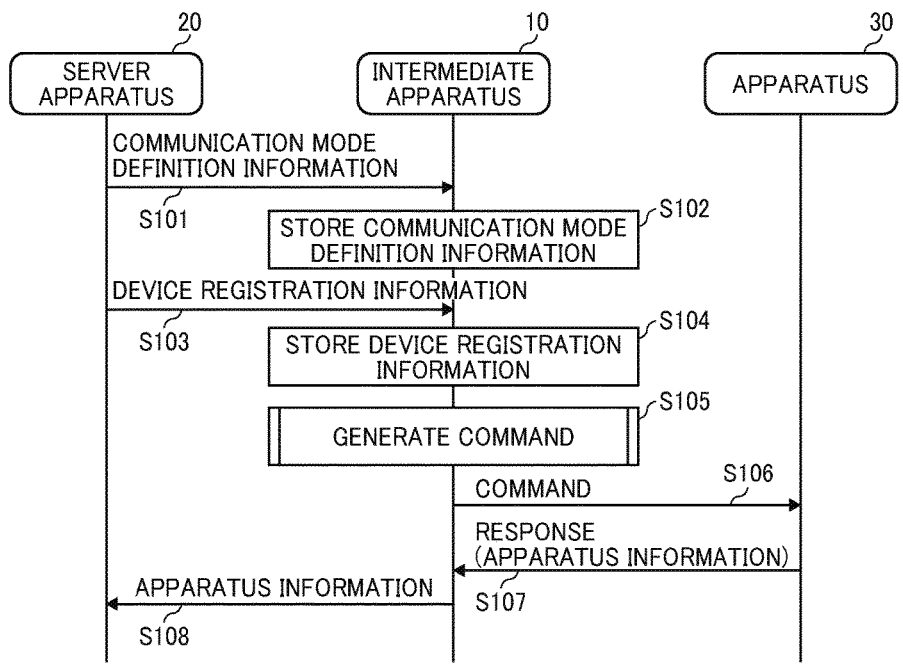

FIG. 6A

| ITEM | VALUE |
|---|---|
| VERSION INFORMATION | 0×01 |
| COMMUNITY NAME | public |
| PDU TYPE | GetRequest |
| REQUEST ID | 0×4649 |
| MIB LIST | 0×30, 0×44 |
| | 0×30, 0×0c, 0×06, 0×08, 0×2b, 0×06, 0×01, 0×02, 0×01, 0×01, 0×02, 0×00, 0×05, 0×00, // MIB (sysObject-ID). |
| | 0×30, 0×10, 0×06, 0×0c, 0×06, 0×2b, 0×06, 0×01, 0×04, 0×01, 0×82, 0×6f, 0×03, 0×02, 0×01, 0×06, 0×0c, 0×01, 0×0a, 0×01, 0×05, 0×00, // MIB (DEVICE TYPE). |
| | 0×30, 0×10, 0×06, 0×0c, 0×06, 0×2b, 0×06, 0×01, 0×04, 0×01, 0×82, 0×6f, 0×03, 0×02, 0×01, 0×0a, 0×0c, 0×02, 0×05, 0×00, // MIB (DEVICE NAME) |
| | 0×03, 0×02, 0×01, 0×0a, 0×0c, 0×02, 0×2b, 0×06, 0×01, 0×04, 0×01, 0×82, 0×6f, 0×03, 0×02, 0×01, 0×0a, 0×03, 0×05, 0×00 // MIB (CONNECTING CODE) |

FIG. 6B

| ITEM | VALUE |
|---|---|
| METHOD | GET |
| URI | /state |
| QUERIST RING | NONE |
| VERSION | 1.1 |

FIG. 6C

| ITEM | VALUE |
|---|---|
| DATA SIZE (BYTES) | 4 |
| DATA OF REQUESTING DEVICE TO ACQUIRE DATA | 0×30313233 |

| DEVICE IDENTIFIER | DEVICE TYPE | COMMUNICATION ADDRESS | ADDITIONAL INFORMATION |
|---|---|---|---|
| 001 | MFP | ADDRESS A | INTERVAL OF 1 HOUR |
| 002 | PROJECTOR | ADDRESS B | INTERVAL OF 2 HOURS |
| 003 | TEMPERATURE/ HUMIDITY SENSOR | ADDRESS C | INTERVAL OF 30 MINUTES |
| ⋮ | ⋮ | ⋮ | ⋮ |

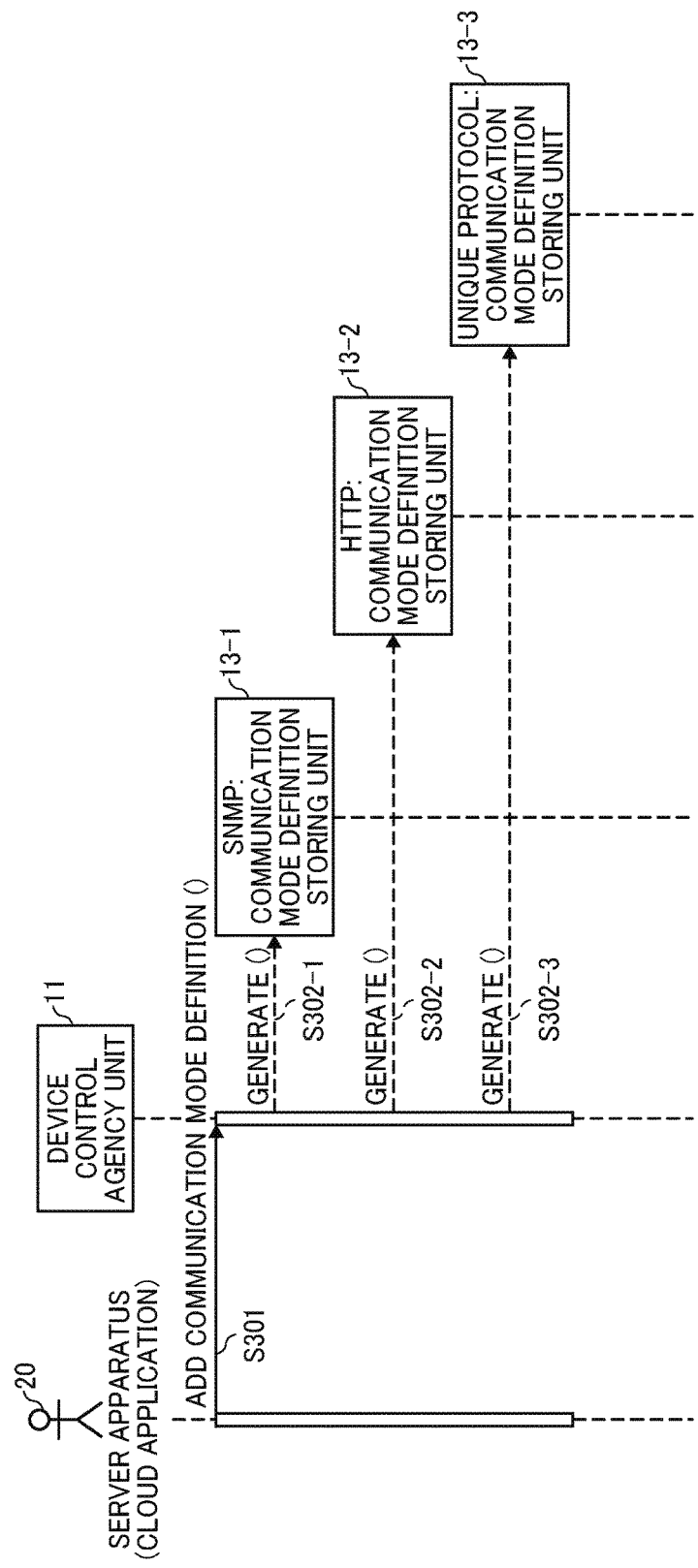

MANAGING SYSTEM, INTERMEDIATE APPARATUS, AND MANAGING METHOD

CROSS-REFERENCE TO RELATED APPLICATION

This patent application is based on and claims priority pursuant to 35 U.S.C. § 119(a) to Japanese Patent Applications No. 2016-106737, filed on May 27, 2016, and No. 2017-029485, filed on Feb. 20, 2017 in the Japan Patent Office, the entire disclosure of which is hereby incorporated by reference herein.

BACKGROUND

Technical Field

The present invention relates to a managing system, an intermediate apparatus, and a managing method.

Background Art

A technology that acquires apparatus information such as an amount of consumed toner and accumulated used hours from various imaging apparatuses such as multifunction peripherals (MFPs) and projectors etc. used at offices and manages those various imaging apparatuses remotely is known.

SUMMARY

Example embodiments of the present invention provide a novel managing system that includes a managing apparatus that transfers command information corresponding to a type of the apparatus to the intermediate apparatus and an intermediate apparatus including circuitry that acquires apparatus information from the apparatus in response to the command information transferred by the managing apparatus, and transfers the acquired apparatus information to the managing apparatus.

Further example embodiments of the present invention provide an intermediate apparatus and a method of managing an apparatus.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 4 is a sequence chart illustrating an operation performed by the remote managing system as an embodiment of the present invention;

FIG. 5 is a diagram illustrating data stored in a communication method definition storing unit as an embodiment of the present invention;

FIGS. 6A, 6B, and 6C are diagrams illustrating a communication protocol detailed definition as an embodiment of the present invention;

FIG. 10 is a sequence chart illustrating an operation of registering a communication method definition as an embodiment of the present invention;

Figure 1:
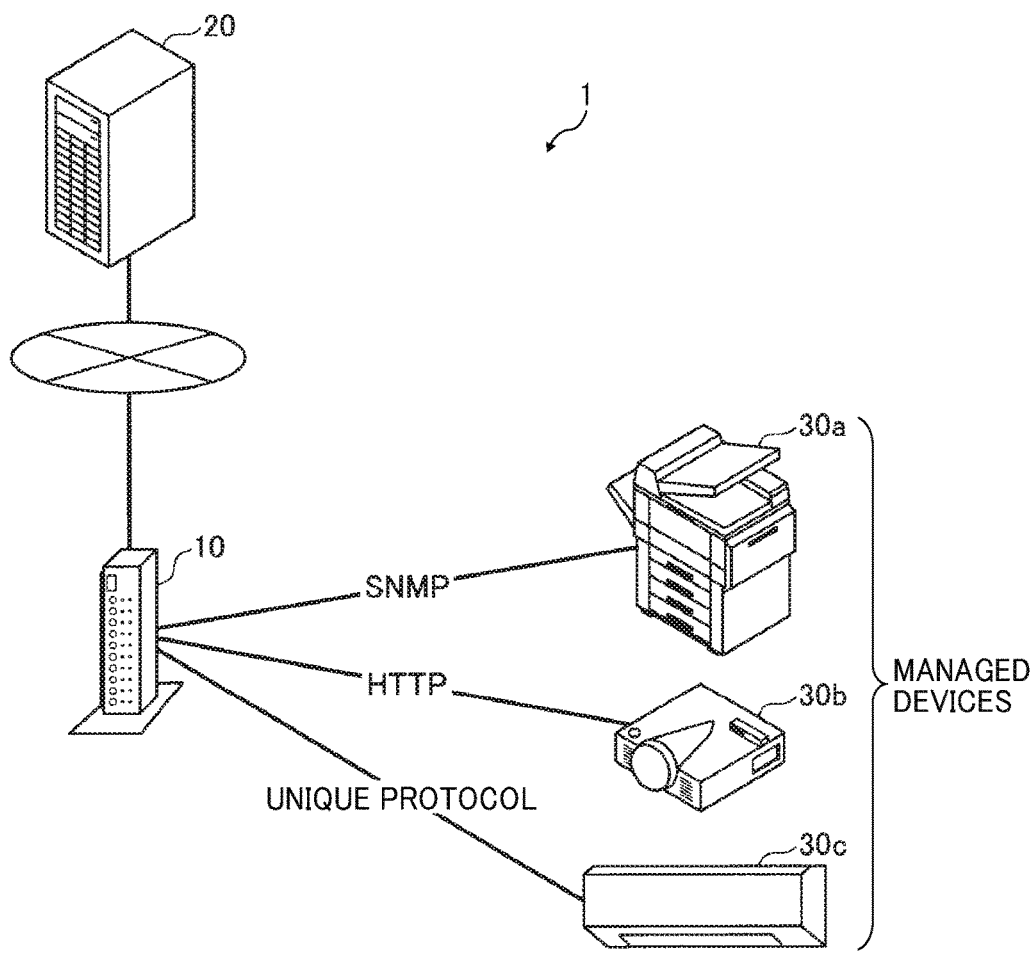
FIG. 1 is a diagram illustrating a configuration of a remote managing system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

Exemplary embodiments of this disclosure are now described below with reference to the accompanying drawings. FIG. 1 is a diagram illustrating a configuration of a remote managing system in this embodiment. In FIG. 1, the remote managing system 1 includes an intermediate apparatus 10, a server apparatus 20, and multiple apparatuses 30a, 30b, and so on (hereinafter appropriately referred to as "apparatus 30" collectively).

For example, the server apparatus 20 is communicably connected to the intermediate apparatus 10 via a communication network such as the internet and a mobile communication network (e.g., 3G and LTE etc.).

The intermediate apparatus 10 is communicably connected to the apparatus 30 via a communication network such as a local area network (LAN) and a wireless LAN etc.

For example, the server apparatus 20 is located at a center (i.e., a cloud center). The intermediate apparatus 10 and the apparatus 30 are located at an office and a business place for example.

The intermediate apparatus 10 may be a dedicated apparatus, or the intermediate apparatus 10 may be included in the MFP for example.

Examples of the apparatus 30 are the MFP, a printer, a copier, a facsimile, a teleconference apparatus, and an electronic whiteboard etc. In addition, the apparatus 30 may be an apparatus such as a temperature/humidity sensor, an air conditioner, and a refrigerator etc.

The server apparatus 20 acquires a usage history and status information of the apparatus 30 from the intermediate apparatus 10 and manages the apparatus 30.

Hardware Configuration

Figure 2:
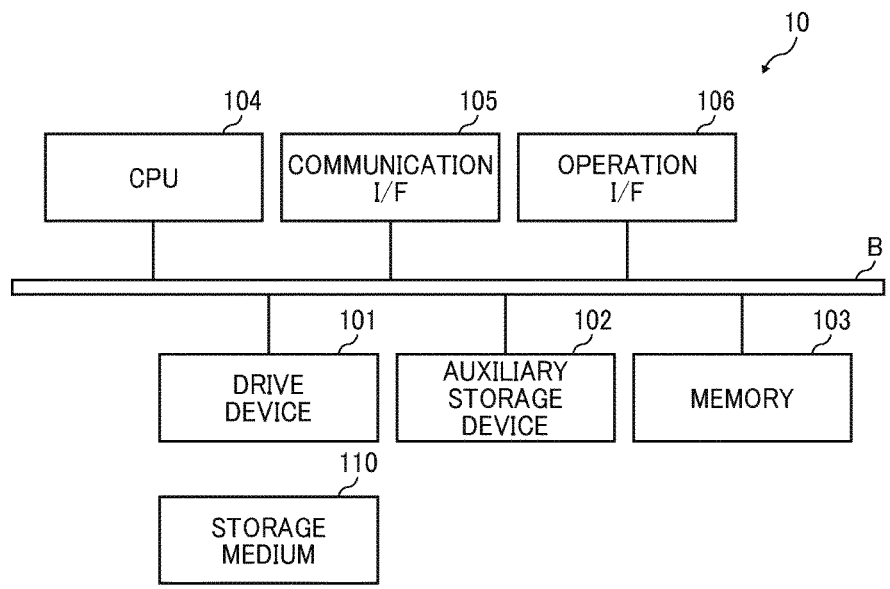
FIG. 2 is a block diagram illustrating the hardware configuration of an intermediate apparatus as an embodiment of the present invention.

FIG. 2 is a block diagram illustrating the hardware configuration of an intermediate apparatus in this embodiment.

The intermediate apparatus 10 includes a drive device 101, a hard disk drive (HDD) 102, a memory 103, a central processing unit (CPU) 104, a communication interface (I/F) 105, and an operation I/F 106 connected with each other via a bus B.

The HDD 102 stores an installed program, as well as a required file and data etc. The memory 103 reads a program from the HDD 102 during startup and stores the program.

Subsequently, the CPU 104 implements various operations (described later) in accordance with the program stored in the memory 103.

The communication I/F 105 consists of a USB port, a wireless LAN card, and a LAN card etc. and is used for connecting to the network.

The operation I/F 106 is implemented by using a keyboard and a display etc. and displays an operation screen for operating the intermediate apparatus 10.

If an information processing method in this embodiment (described later) is implemented by a program, for example, the program may be provided by distributing a recording medium 110 and downloading the program from a network etc. Various types of the recording medium such as a recording medium that stores information optically, electrically, or magnetically such as a Compact Disc Read Only Memory (CD-ROM), a flexible disk, and an magnetic optical disc etc. and a semiconductor memory that stores information electrically such as a read only memory (ROM) and a flash memory etc. may be used for the recording medium 110.

After setting the recording medium 110 that the program in this embodiment in the drive device 101, the program is read from the recording medium 110 and installed in the HDD 102 via the drive device 101. In case of downloading the program from the network, the program is installed in the HDD 102 via the communication I/F 105.

The hardware configuration of the server apparatus 20 and the apparatus 30 may be similar to the hardware configuration of the intermediate apparatus 10 illustrated in FIG. 2.

First Embodiment

Functional Configuration

Figure 3:
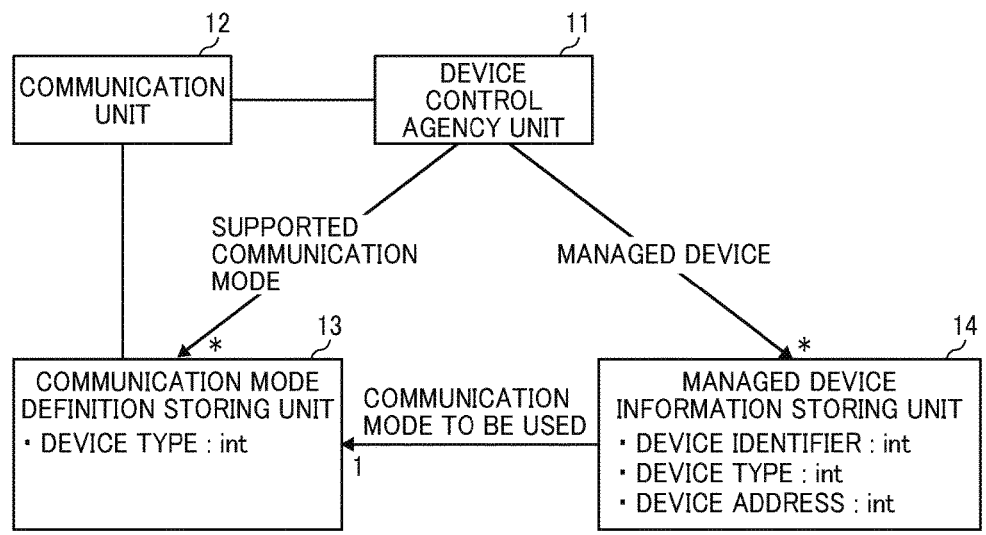
FIG. 3 is a diagram illustrating functional blocks in the intermediate apparatus as an embodiment of the present invention.

Next, descriptions are given below of a functional configuration of the intermediate apparatus 10 according to the present embodiment with reference to FIG. 3. FIG. 3 is a diagram illustrating functional blocks in the intermediate apparatus in this embodiment. The intermediate apparatus 10 includes a device control agency unit 11 and a communication unit 12. The components described above may be implemented by executing one or more programs installed in the intermediate apparatus 10 by the CPU 104 included in the intermediate apparatus 10.

In addition, the intermediate apparatus 10 includes a communication method definition storing unit 13 and a managed device information storing unit 14. For example, these storing units may be implemented by executing one or more programs installed in the intermediate apparatus 10 and using the CPU 104 and the HDD 102 as the auxiliary storage device etc. included in the intermediate apparatus 10.

The communication unit 12 communicates with the server apparatus 20 and the apparatus 30, receives device registration information and communication method definition information from the server 20, and receives apparatus information from the apparatus 30. It should be noted that the apparatus information is information regarding the apparatus 30. Assuming that the apparatus 30 is the MFP, the apparatus information may be information such as a history of the number of printed sheets, a stored print job, and an amount of toner remaining etc.

Based on the device registration information (registration information) and the communication method definition information reported by the server apparatus 20, the device control agency unit 11 acquires the apparatus information from the apparatus 30 specified in the device registration information.

The communication method definition storing unit 13 stores the communication method definition information including a type of the apparatus and information on the communication protocol used by the apparatus etc. reported by the server apparatus 20.

The managed device information storing unit 14 stores the registration information including a type of the apparatus and information on the communication address used by the apparatus etc. reported by the server apparatus 20. In addition, in accordance with the type of the apparatus included in the registration information and the type of the apparatus included in the communication method definition information stored in the communication method definition storing unit 13, the managed device information storing unit 14 associates the registration information with the communication method definition information.

Operation Performed by System

Next, with reference to FIG. 4, an operation performed by the remote managing system 1 in this embodiment is described below. FIG. 4 is a sequence chart illustrating an operation performed by the remote managing system in this embodiment.

The server apparatus 20 reports the communication method definition information to the intermediate apparatus 10 in S101.

The intermediate apparatus 10 stores the reported communication method definition information in the communication method definition storing unit 13 in S102.

FIG. 5 is a diagram illustrating data stored in the communication method definition storing unit 13 in this embodiment. In the communication method definition storing unit 13, items such as a communication protocol type, available device type, communication port, and detailed definition of communication protocol are registered associated with each other.

The communication protocol type is information for specifying the communication protocol such as Simple Network Management Protocol (SNMP) and Hypertext Transfer Protocol (HTTP) etc.

For example, the device type is information indicating a type of the apparatus 30 (device) such as the MFP and the projector etc.

The communication port is information indicating a communication port used for the communication protocol type.

The detailed definition of communication protocol is information indicating data of a command of acquiring apparatus information to the apparatus 30 used in the communication protocol type.

FIGS. 6A, 6B, and 6C are diagrams illustrating a communication protocol detailed definition in this embodiment. FIG. 6A is a diagram illustrating a detailed definition of communication protocol for SNMP. FIG. 6B is a diagram illustrating a detailed definition of communication protocol for HTTP. FIG. 6C is a diagram illustrating a detailed definition of communication protocol for a unique protocol.

The server apparatus 20 reports the device registration information to the intermediate apparatus 10 in S103.

The intermediate apparatus 10 stores the reported device information in the managed device information storing unit 14 in S104.

Figures 7, 8:
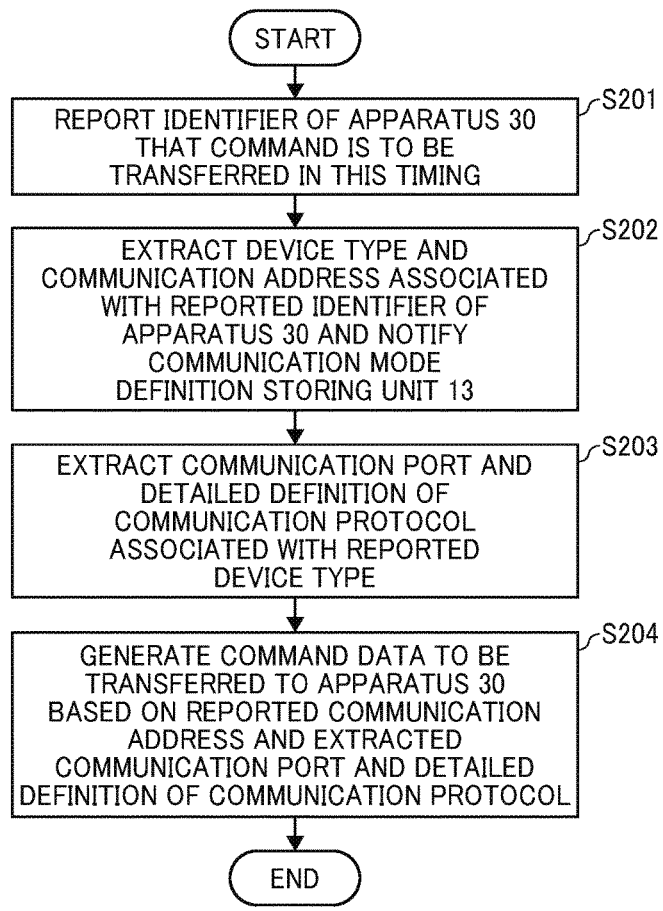
FIG. 7 is a diagram illustrating data stored in a managed device information storing unit as an embodiment of the present invention.
FIG. 8 is a flowchart illustrating an operation of generating a command as an embodiment of the present invention.

FIG. 7 is a diagram illustrating the data stored in the managed device information storing unit 14 in this embodiment. In the managed device information storing unit 14, items such as a device identifier, device type, communication address, and additional information are registered associated with each other.

The device identifier is information for identifying a device uniquely. For example, MAC address etc. may be used for the device identifier.

For example, the device type is information indicating a type of the apparatus 30 (device) such as the MFP and the projector etc. and used for associating the device with the communication method definition.

The communication address is a communication address of the apparatus 30 such as IP address etc.

The additional information is information specifying a monitoring interval and a network I/F used for the communication etc.

Based on the device information and the communication method definition information, the intermediate apparatus 10 generates a command to the apparatus 30 in S105.

The intermediate apparatus 10 transfers the generated command to the apparatus 30 in S106.

The intermediate apparatus 10 receives the apparatus information as a response to the command from the apparatus 30 in S107.

The intermediate apparatus 10 reports the apparatus information included in the response received from the apparatus 30 to the server apparatus 20 in S108.

Operation of Generating Command

Next, with reference to FIG. 8, the operation of generating the command in step S105 in FIG. 4 is described below. FIG. 8 is a flowchart illustrating the operation of generating the command in this embodiment.

The device control agency unit 11 reports the identifier of the apparatus 30 to which the command is transferred at the timing this time to the managed device information storing unit 14 in 5201.

The managed device information storing unit 14 extracts the device type and communication address associated with the reported identifier of the apparatus 30 and report the extracted device type and communication address to the communication method definition storing unit 13 in S202.

Next, the communication method definition storing unit 13 extracts the communication port and the detailed definition of communication protocol associated with the reported device type in S203.

Next, based on the communication address reported in S202 and the data of the communication port and detailed definition of communication protocol extracted in S203, the communication method definition storing unit 13 generates communication data for the command transferred to the apparatus 30 in S204.

Layout of Object in Memory

Next, with reference to FIGS. 9A, 9B, and 9C, a layout of object data in a memory included in the intermediate apparatus 10 in this embodiment is described below.

Figure 9A:
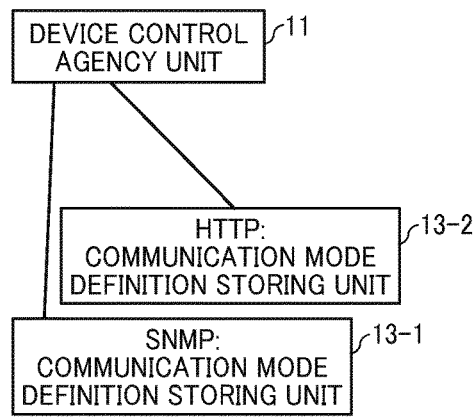
FIGS. 9A, 9B, and 9C are diagrams illustrating a layout of object data in a memory included in an intermediate apparatus as an embodiment of the present invention.
Figure 9B:
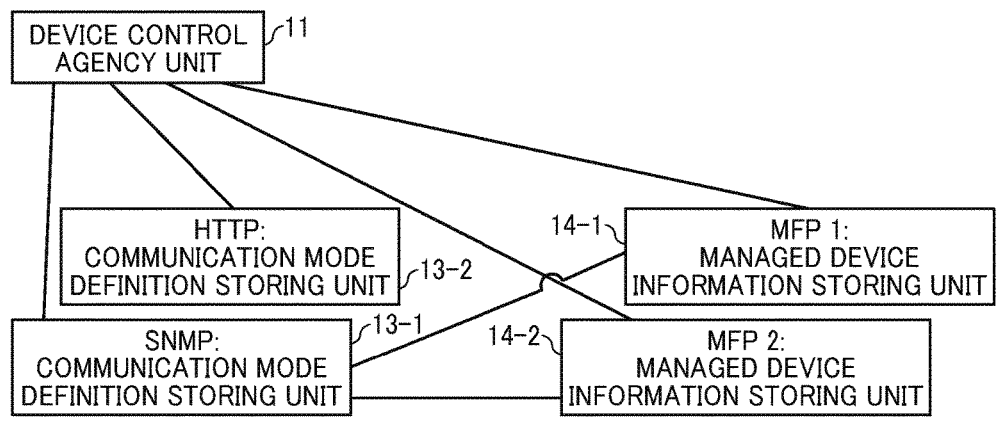
Figure 9C:
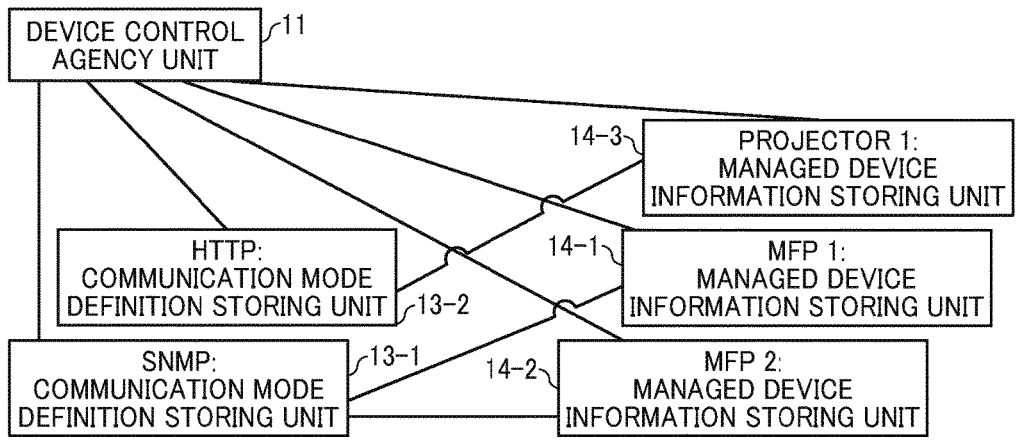

FIGS. 9A, 9B, and 9C are diagrams illustrating a layout of object data in a memory included in the intermediate apparatus 10 in this embodiment.

In FIG. 9A, a SNMP communication method definition storing unit 13-1 and a HTTP communication method definition storing unit 13-2 stored in the communication method definition storing unit 13 are laid out as object data in the memory.

In FIG. 9B, the SNMP communication method definition storing unit 13-1 is associated with the managed device information storing unit for two MFPs 14-1 and 14-2. In FIG. 9C, in the status illustrated in FIG. 9B, a projector is added as the apparatus 30 to be monitored. The HTTP communication method definition storing unit 13-2 is associated with the projector managed device information storing unit 14-3.

Registration of Communication Method Definition

Next, with reference to FIG. 10, the operations in steps S102 and S103 in FIG. 4 are described below. FIG. 10 is a sequence chart illustrating an operation of registering the communication method definition in this embodiment.

The server apparatus 20 reports the communication method definition information to the device control agency unit 11 in the intermediate apparatus 10 in S301.

Next, the device control agency unit 11 generates communication method definition storing units 13-1, 13-2, and so on for each of the communication protocols included in the reported communication method definition information in steps S302-1, S302-2, and so on.

As a result, as illustrated in FIG. 9A described above, the SNMP communication method definition storing unit 13-1, the HTTP communication method definition storing unit 13-2, and so on are laid out as object data in the memory.

Registration (Addition) of Managed Device

Figure 11:
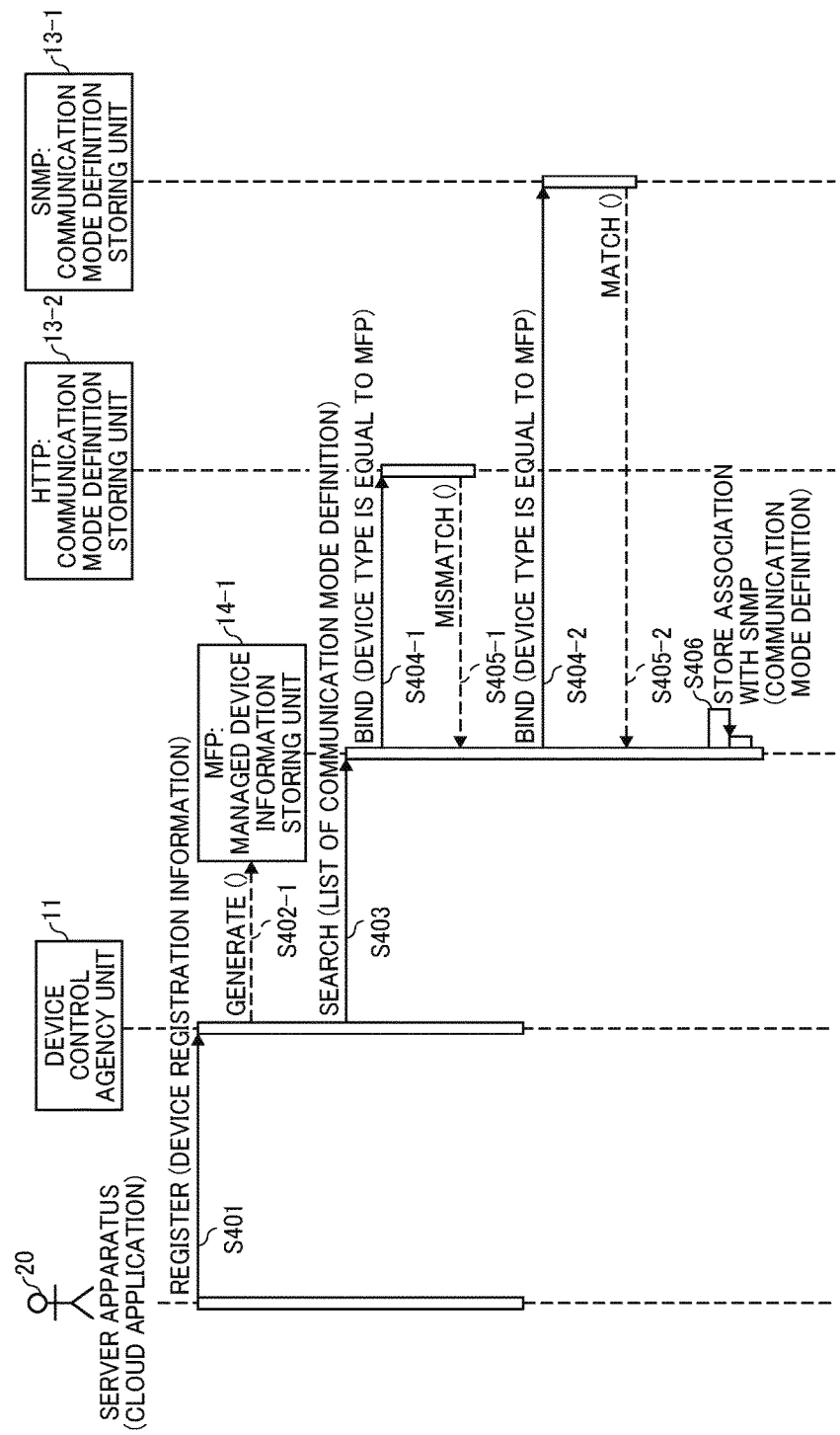
FIG. 11 is a sequence chart illustrating an operation of registering a managed device as an embodiment of the present invention.

Next, with reference to FIG. 11, the operations in steps S103 and S104 in FIG. 4 are described below. FIG. 11 is a sequence chart illustrating an operation of registering the managed device in this embodiment.

The server apparatus 20 reports the device registration information to the device control agency unit 11 in the intermediate apparatus 10 in S401.

Next, the device control agency unit 11 generates managed device information storing units 14-1 and so on for each of the device identifiers included in the reported device registration information in steps S402-1 and so on.

Next, the device control agency unit 11 reports the list of the communication method definition storing units 13-1, 13-2, and so on to each of the managed device information storing units 14-1 and so on in S403.

In the order of the reported list, each of the managed device information storing units 14-1 and so on reports a binding request including the data of the device type stored in the managed device information storing units 14-1 and so on respectively to each of the communication method definition storing units 13-1, 13-2, and so on in steps S404-1, S404-2, and so on.

Each of the communication method definition storing units 13-1, 13-2, and so on determines whether or not the device type included in the reported binging request corresponds to the device type stored in each of the communication method definition storing units 13-1, 13-2, and so on respectively. If the device type included in the reported binging request does not correspond to the device type stored in each of the communication method definition storing units 13-1, 13-2, and so on, each of the communication method definition storing units 13-1, 13-2, and so on reports that the device type included in the reported binging request does not correspond to the device type stored in each of the communication method definition storing units 13-1, 13-2, and so on (mismatch) in S405-1. If the device type included in the reported binging request corresponds to the device type stored in each of the communication method definition storing units 13-1, 13-2, and so on, each of the communication method definition storing units 13-1, 13-2, and so on reports that the device type included in the reported binging request corresponds to the device type stored in each of the communication method definition storing units 13-1, 13-2, and so on (match) in S405-2.

It should be noted that each of the managed device information storing units 14-1 and so on reports the binding request in the order of the list until the notification indicating that the device type included in the reported binging request corresponds to the device type stored in each of the communication method definition storing units 13-1, 13-2, and so on is received.

After receiving the notification indicating that the device type included in the reported binging request corresponds to the device type stored in each of the communication method definition storing units 13-1, 13-2, and so on, each of the managed device information storing units 14-1 and so on stores the association with the communication method definition storing unit 13-1 that reported that the device type included in the reported binging request corresponds to the device type stored in each of the communication method definition storing units 13-1, 13-2, and so on in S406.

As a result, as illustrated in FIGS. 9B and 9C described above, the SNMP communication method definition storing unit 13-1 is associated with the MFP managed device information storing units 14-1 and 14-2, and the HTTP communication method definition storing unit 13-2 is associated with the projector managed device information storing unit 14-3.

Transfer of Apparatus Information (Device Information)

Figure 12:
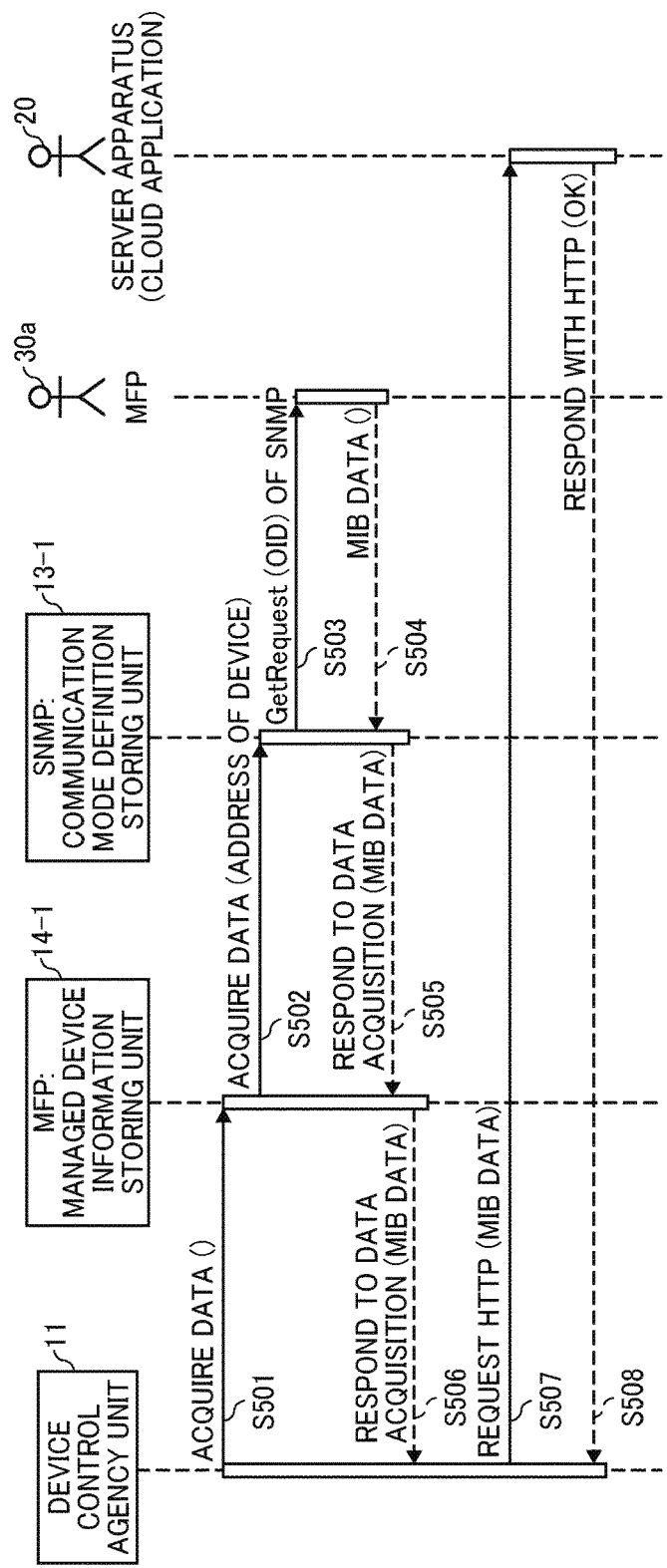
FIG. 12 is a sequence chart illustrating an operation of transferring apparatus information (device information) as an embodiment of the present invention.

Next, with reference to FIG. 12, the operations in steps S105 to S108 in FIG. 4 are described below. FIG. 12 is a sequence chart illustrating an operation of transferring apparatus information (device information) in this embodiment.

At a predetermined timing in accordance with the apparatus 30*a* as the MFP, the device control agency unit 11 in the intermediate apparatus 10 requests the managed device information storing unit 14-1 associated with the apparatus 30*a* to acquire the apparatus data in S501.

The managed device information storing unit 14-1 transfers a request of acquiring data including the communication address of the apparatus 30*a* to the communication method definition storing unit 13-1 whose association was stored in S406 in S502.

The communication method definition storing unit 13-1 transfers a command in the basis of the data of the detailed definition of communication protocol stored in the communication method definition storing unit 13-1 to the communication address of the apparatus 30*a* and the communication port stored in the communication method definition storing unit 13-1 in S503.

The communication method definition storing unit 13-1 receives a response including the apparatus data from the apparatus 30*a* in S504.

The communication method definition storing unit 13-1 reports the response including the apparatus data to the managed device information storing unit 14-1 in S505.

The managed device information storing unit 14-1 reports the response including the apparatus data to the device control agency unit 11 in S506.

The device control agency unit 11 reports the identifier of the apparatus 30*a* and the apparatus data to the server apparatus 20 in S507.

Effect of First Embodiment

In this embodiment, as described above, the intermediate apparatus 10 receives the definition of the communication method for each device type and the device information to be managed from the server apparatus 20. Subsequently, the intermediate apparatus 10 dynamically associates the definition of the communication method for each device type with the device information to be managed, acquires the apparatus information from the apparatus 30, and transfers the acquired apparatus information to the server apparatus 20. As a result, instead of updating firmware of the intermediate apparatus 10 located at the business place, the number of device type to be managed remotely may be increased easily.

Second Embodiment

In the first embodiment, the case that the intermediate apparatus 10 collects the apparatus information from the apparatus 30 to be monitored at the predetermined timing is described. In this embodiment, the case that the intermediate apparatus 10 collects the apparatus information from the apparatus 30 to be monitored at a timing in accordance with the device type to be monitored is described.

Some parts of this embodiment are similar to the first embodiment. Therefore, descriptions for those parts are omitted appropriately. In the below description, descriptions for parts common to the first embodiment are omitted, and only parts different from the first embodiment are described. It should be noted that descriptions in this embodiment may be applied to the first embodiment.

Functional Configuration

Figure 13:
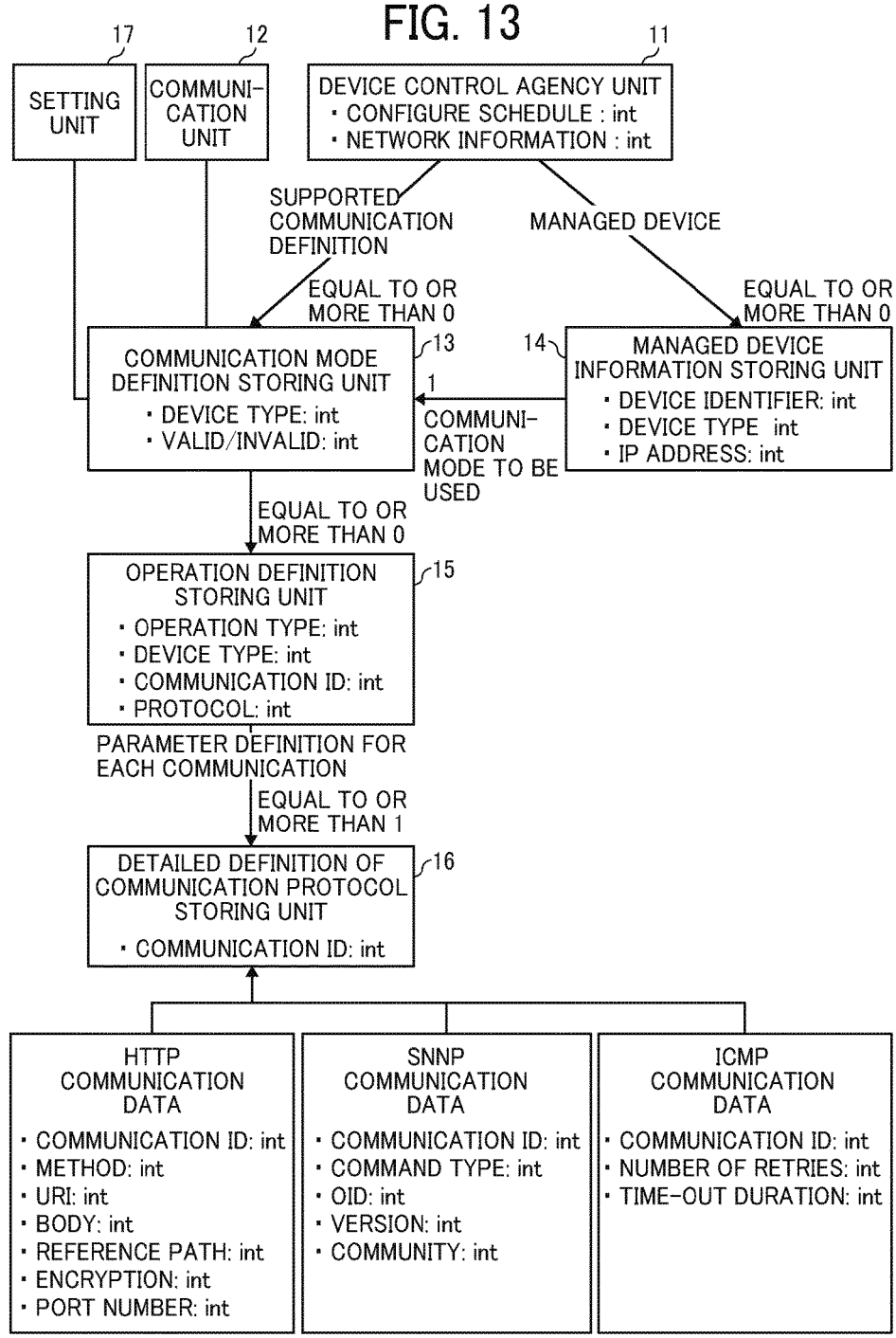
FIG. 13 is a diagram illustrating functional blocks in the intermediate apparatus as an embodiment of the present invention.

Next, descriptions are given below of a functional configuration of the intermediate apparatus 10 according to the present embodiment with reference to FIG. 13. FIG. 13 is a diagram illustrating functional blocks in the intermediate apparatus in this embodiment.

For example, in accordance with settings configured by the server apparatus 20, the device control agency unit 11 in the intermediate apparatus 10 in this embodiment may configure either a mode that the apparatus information (device information) in FIG. 12 is transferred immediately after receiving the request from the server apparatus 20 or a mode that the apparatus information (device information) in FIG. 12 is transferred in accordance with a schedule configured by the intermediate apparatus 10. In the case of the mode that the apparatus information (device information) is transferred in accordance with the schedule, priorities for requests to perform the transmission and an upper limit value that can configure the request to perform the transmission may be configured.

The communication method definition storing unit 13 in the intermediate apparatus 10 in this embodiment stores the device type and information of "valid/invalid". "Valid/invalid" is information that configures whether information stored in the communication method definition storing unit 13 is valid or invalid. If the information is configured as valid, the device control agency unit 11 performs the transmission using the information stored in the communication method definition storing unit 13. If the information is configured as invalid, the device control agency unit 11 does not perform the transmission using the information stored in the communication method definition storing unit 13. As a result, in case of analyzing trouble in the intermediate apparatus 10, it is possible to run trials isolating cause of trouble for each device type.

The intermediate apparatus 10 in this embodiment further includes a configuring unit 17. The configuring unit 17 may be implemented by executing one or more programs installed in the intermediate apparatus 10 by the CPU 104 in the intermediate apparatus 10.

For example, in accordance with user operation, the configuring unit 17 configures the information on "valid/invalid" stored in the communication method definition storing unit 13.

In addition, the intermediate apparatus 10 in this embodiment further includes an operation definition storing unit 15 and a communication protocol detailed definition storing unit 16. For example, these storing units may be implemented by executing one or more programs installed in the intermediate apparatus 10 and using the CPU 104 and the HDD 102 as the auxiliary storage device etc. included in the intermediate apparatus 10.

The operation definition storing unit 15 stores operation definition information including information such as an operation type, device type, communication ID, and protocol etc.

The operation type is information indicating a type of an operation of the intermediate apparatus 10. For example, collecting regularly, monitoring availability, adding a device, deleting a device, discovering a device, and acquiring a device identifier etc. are included in the operation type. Collecting regularly is a type of an operation that acquires information from the apparatus 30 regularly such as once a day etc. Monitoring availability is a type of an operation that monitors an operating status of the apparatus 30 such as whether or not the apparatus 30 operates normally. Adding a device is a type of an operation that adds the apparatus 30 to be monitored newly. Deleting a device is a type of an operation that deletes the apparatus 30 from the monitored target. For example, if the intermediate apparatus 10 is installed newly and connected to a network at an office etc.,
discovering a device is a type of an operation that discovers the apparatus 30 connected to the network. In this case, for example, the intermediate apparatus 30 broadcasts or multicasts a predetermined request, and the apparatus 30 transfers a response to the request.

Acquiring a device identifier is a type of an operation that acquires a device identifier configured in the apparatus 30. It should be noted that the device identifier may include information indicating installation location configured in the apparatus 30. If the device identifier may not be acquired from the apparatus 30, the device identifier specified by the server apparatus 20 may be used. As a result, for example, apparatuses 30 such as a rooter and an AC power tap etc. that may not respond such as ping etc. may be added to the target to be monitored. It should be noted that, in the basis of information acquired by performing the operations such as adding a device, deleting a device, discovering a device, and acquiring a device identifier, the device control agency unit 11 may modify the information stored in the managed device information storing unit 14.

The communication ID and protocol are information indicating and ID of the detailed information of communication protocol and protocol respectively stored in the communication protocol detailed definition storing unit 16. In case of identifying the detailed information of communication protocol by using the communication ID only, the item of protocol may be used. In addition, in one operation definition information, multiple communication IDs and protocols may be configured. As a result, for example, if only a command using HTTP is supported for one data item and only a command using SNMP is supported for another data item, the command using HTTP and the command using SNMP may be combined sequentially and used.

The communication protocol detailed definition storing unit 16 stores information on a command to acquire the apparatus information from the apparatus 30 by using HTTP, SNMP, and ICMP etc. associated with the communication ID.

Layout of Object in Memory

Next, with reference to FIG. 14, a layout of object data in a memory included in the intermediate apparatus 10 in this embodiment is described below.

Figure 14:
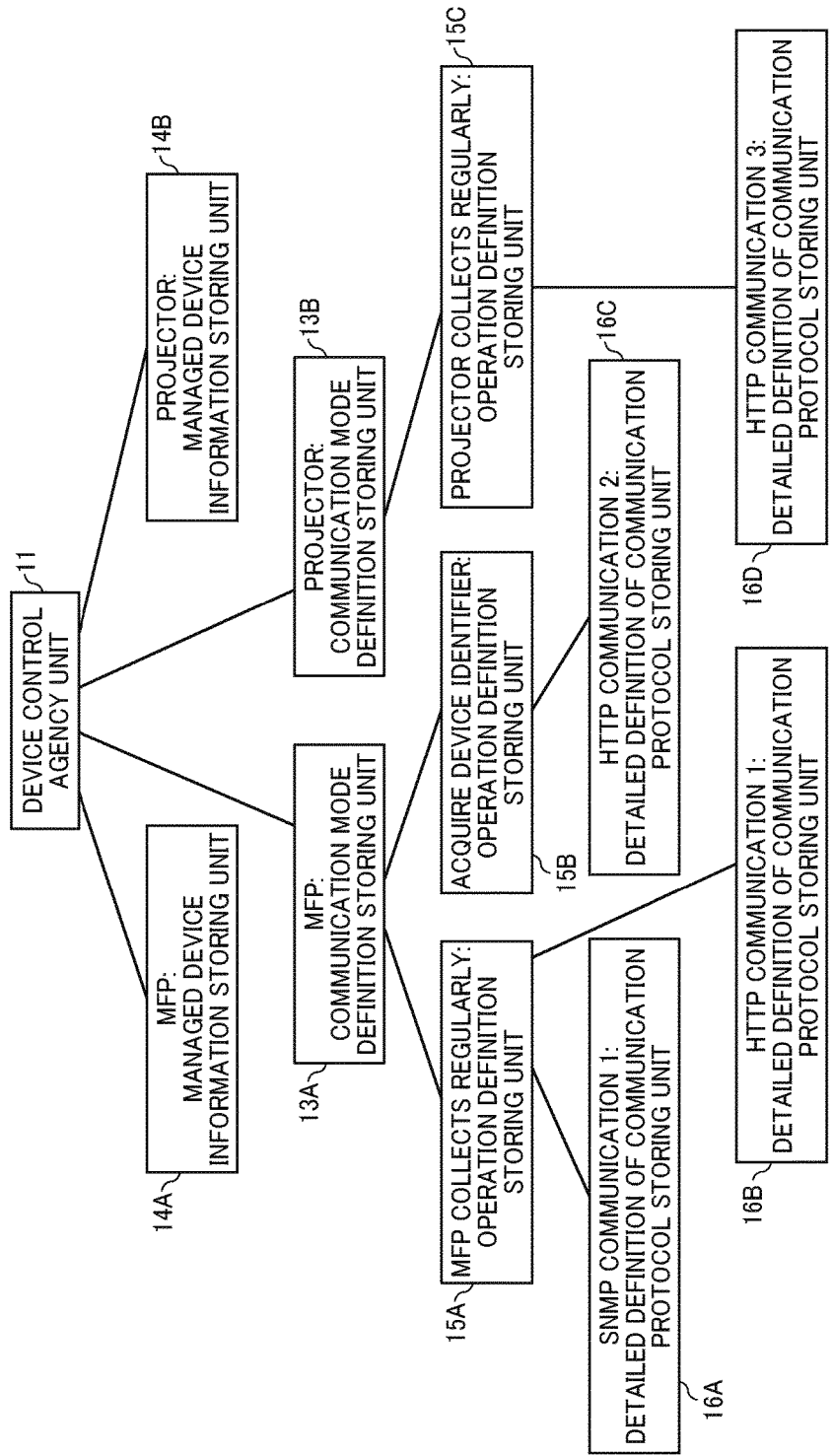
FIG. 14 is a diagram illustrating a layout of object data in a memory included in an intermediate apparatus as an embodiment of the present invention.
Figure 15:
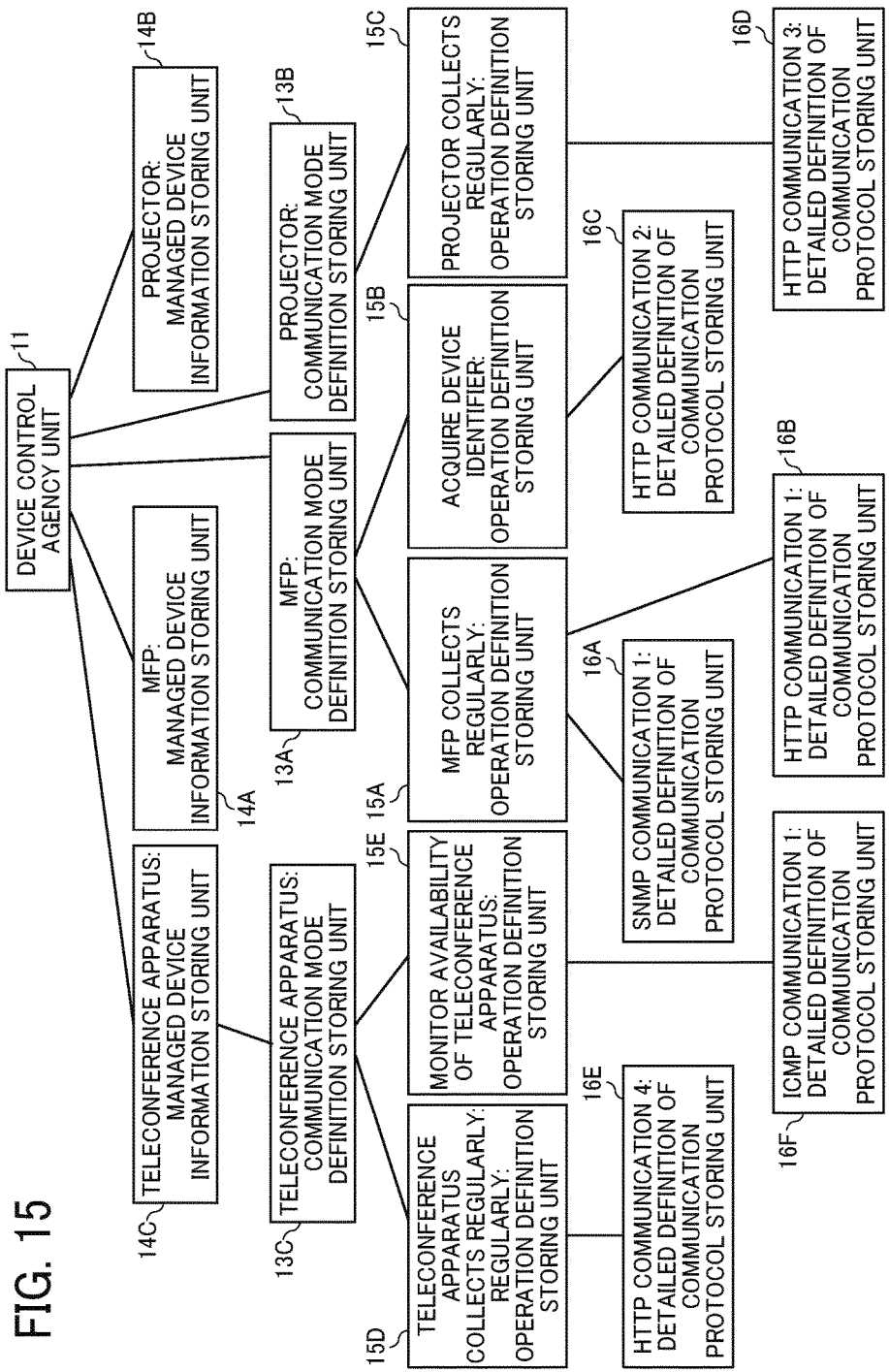
FIG. 15 is a diagram illustrating a layout of object data in a memory included in an intermediate apparatus as an embodiment of the present invention.
Figure 16:
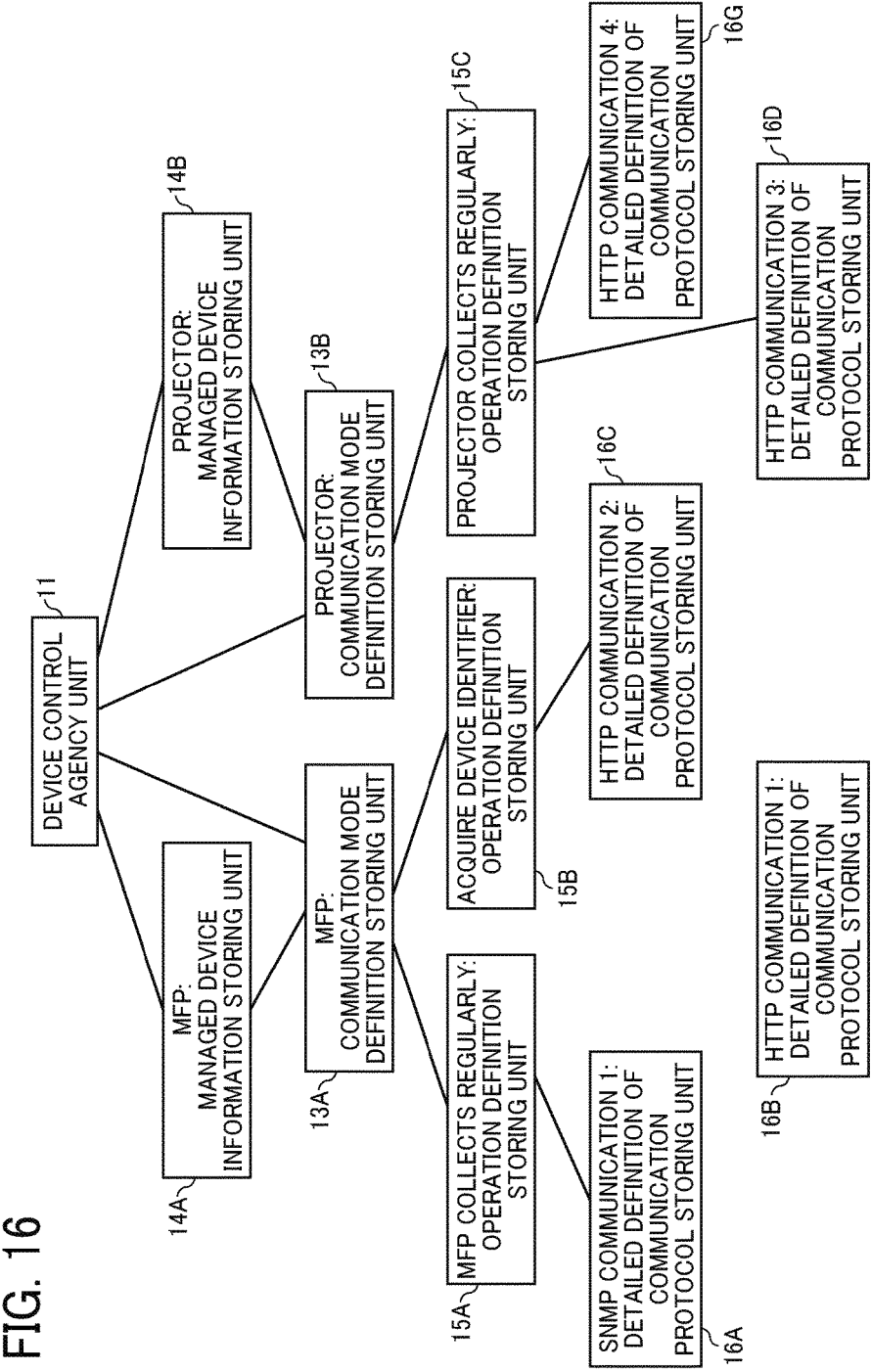
FIG. 16 is a diagram illustrating a layout of object data in a memory included in an intermediate apparatus as an embodiment of the present invention.

FIGS. 14 to 16 are diagrams illustrating a layout of object data in a memory included in the intermediate apparatus 10 in this embodiment.

In FIG. 14, a MFP managed device information storing unit 14A and a projector managed device information storing unit 14B stored in the managed device information storing unit 14 are laid out as object data in the memory. In addition, a MFP communication method definition storing unit 13A and a projector communication method definition storing unit 13B stored in the communication method definition storing unit 13 are laid out as object data in the memory.

An operation definition storing unit of MFP for collecting regularly 15A and an operation definition storing unit for acquiring a device identifier 15B are associated with the MFP communication method definition storing unit 13A. In addition, an operation definition storing unit of projector for collecting regularly 15C is associated with the projector communication method definition storing unit 13B.

A communication protocol detailed definition storing unit 16A that a communication ID for SNMP is "1" and a communication protocol detailed storing unit 16B that a communication ID for HTTP is "1" are associated with the operation definition storing unit of MFP for collecting regularly 15A. In addition, a communication protocol detailed definition storing unit 16C that a communication ID for HTTP is "2" is associated with the operation definition storing unit for acquiring a device identifier 15B. A communication protocol detailed definition storing unit 16D that a communication ID for HTTP is "3" is associated with the operation definition storing unit of projector for collecting regularly 15C.

In FIG. 15, object data for configuring a teleconference apparatus as a target to be monitored is added to the case in FIG. 14. In FIG. 15, a teleconference apparatus managed device information storing unit 14C and a teleconference apparatus communication method definition storing unit 13C are associated. In addition, an operation definition storing unit of teleconference apparatus for collecting regularly 15D and an operation definition storing unit for monitoring availability of teleconference apparatus 15E are associated with the teleconference apparatus communication method definition storing unit 13C. A communication protocol detailed definition storing unit 16E that a communication ID for HTTP is "4" and a communication protocol detailed storing unit 16F that a communication ID for ICMP is "1" are associated with the operation definition storing unit of teleconference apparatus for collecting regularly 15D and the operation definition storing unit for monitoring availability of teleconference apparatus 15E.

In FIG. 16, a communication protocol detailed definition storing unit 16G that a communication ID for HTTP is "5" is added to the case in FIG. 14 and associated with the operation definition storing unit of projector for collecting regularly 15C. In addition, the association with the communication protocol detailed definition storing unit 16B is deleted from the operation definition storing unit of MFP for collecting regularly 15A.

As described above, the operation definition may be added or deleted in accordance with the device type. In addition, the communication protocol detailed definition may be added or deleted in accordance with the operation definition information.

Operation Performed by System

Figure 17:
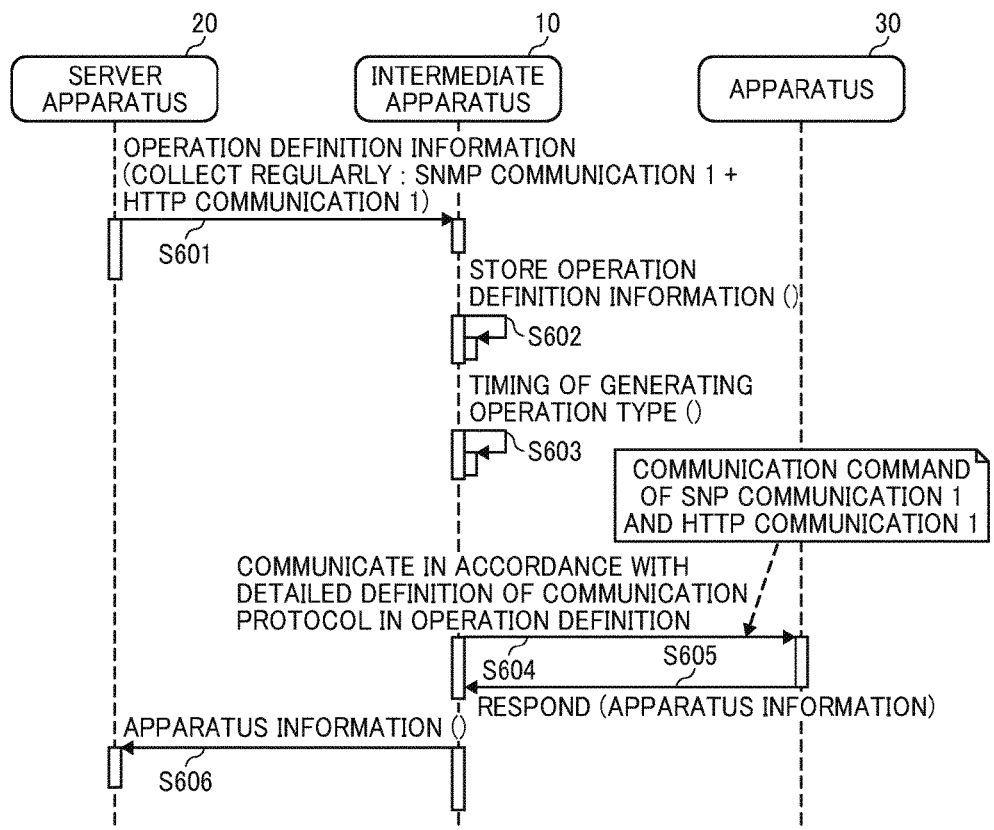
FIG. 17 is a sequence chart illustrating an operation performed by the remote managing system as an embodiment of the present invention.

Next, with reference to FIG. 17, an operation performed by the remote managing system 1 in this embodiment is described below. FIG. 17 is a sequence chart illustrating an operation performed by the remote managing system in this embodiment.

It should be noted that it is assumed that information reported by the server apparatus 20 is stored preliminarily in the communication method definition storing unit 13, the managed device information storing unit 14, and the communication protocol detailed definition storing unit 16.

The server apparatus 20 reports the operation definition information to the intermediate apparatus 10 in S601. In the operation definition information, for example, the device type is configured as "teleconference apparatus", the operation type is configured as "collecting regularly", and the communication ID and protocol is configured as "1" for SNMP and "1" for HTTP.

Next, the device control agency unit 11 in the intermediate apparatus 10 stores the reported operation definition information in the operation definition storing unit 15 in S602.

Next, the device control agency unit 11 in the intermediate apparatus 10 detects a timing of operation in accordance with the operation type in S603. For example, the device control agency unit 11 detects a timing of operation in accordance with the operation "collecting regularly".

Next, the device control agency unit 11 in the intermediate apparatus 10 transfers a command in accordance with the detailed definition of communication protocol associated with the communication ID and protocol included in the reported operation definition information stored in the managed device information storing unit 14 to the apparatus 30 in S604. For example, a command whose communication ID for SNMP is "1" and communication ID for HTTP is "1" is transferred to the apparatus 30 as "the teleconference apparatus".

Next, the device control agency unit 11 in the intermediate apparatus 10 receives the apparatus information as a response to the command from the apparatus 30 in S605.

Next, the device control agency unit 11 in the intermediate apparatus 10 reports the apparatus information included in the response received from the apparatus 30 to the server apparatus 20 in S606.

Figure 18:
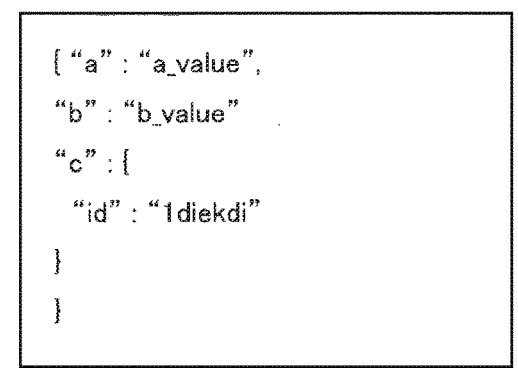
FIG. 18 is a diagram illustrating data included in a response as an embodiment of the present invention.

Next, with reference to FIG. 18, data included in the response to the command received from the apparatus 30 in S605 is described below. FIG. 18 is a diagram illustrating data included in a response in this embodiment. For example, it is assumed that the response to the HTTP command includes data in tree structure as illustrated in FIG. 18.

The device control agency unit 11 in the intermediate apparatus 10 determines whether or not data of reference path (key) is included in the information of the command associated with the communication ID configured by the server apparatus 20 and stored in the communication protocol detailed definition storing unit 16. If the key data is included, a data item corresponding to the specified key may be extracted from the data in tree structure and transferred to the server apparatus 20 as the apparatus information. For example, if "/c/id" is specified as the key, in FIG. 18, data "ldiekdi" is acquired as the apparatus information.

Effect of Second Embodiment

In this embodiment described above, in addition to the effect in the first embodiment, the operation in accordance with the type of the device to be managed remotely may be specified to the intermediate apparatus 10. In addition, commands for multiple protocols may be configured in association with one operation.

SUMMARY

In some cases, apparatuses such as MFPs support similar commands regardless of apparatus model.

In the embodiments described above, commands may be configured in accordance with the device type. As a result, for example, if the number of statuses etc. that may be acquired by the command increases in newer models, the same command may be used. In addition, if a new command is supported in the new model for example, the new command may be added as the command utilized by the intermediate apparatus 10. In this case, older models that do not support the new command just transfers an error as the response to the new command. Therefore, there is no problem if a command is configured for each device type. As a result, instead of updating firmware of the intermediate apparatus 10 located at the business place, the number of device type to be managed remotely may be increased easily. In addition, in accordance with the device type, the command may by modified easily.

The configuration of the remote managing system in the embodiments described above is just an example, and it is possible to configure the remote managing system in various ways depending on usage and purpose. For example, regarding the apparatus 30, sensors and processing facilities in a factory may be configured as targets to be monitored.

The embodiments described above provide a managing system that may add a device type as a target to be managed relatively easily.

The present invention also encompasses a non-transitory recording medium storing a program that executes an apparatus managing method, performed by a managing system that includes a managing apparatus and an intermediate apparatus. The apparatus managing method, performed by the managing system, includes the steps of acquiring apparatus information from the apparatus in response to command information transferred by a managing apparatus, the command information corresponding to a type of the apparatus and transferring the acquired apparatus information to the managing apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A managing system comprising:
a managing apparatus to transfer communication method definition information specifying one or more communication method definitions in accordance with a type of a managed apparatus, and transfer registration information for registering one or more managed apparatuses, to an intermediate apparatus; and
circuity, included in the intermediate apparatus, configured to perform a method comprising:

(a) registering the communication method definition information received from the managing apparatus, including the one or more communication method definitions for the type of the managed apparatus, in respective communication method definition storing units allocated in a storage device of the intermediate apparatus, and registering the registration information received from the managing apparatus, including for each registered apparatus amongst the one or more managed apparatuses, an apparatus identifier and a device type of the registered apparatus, in respective registration information storing units allocated in the storage device;

(b) associating a communication method definition storing unit with a registration information storing unit, upon determining that the type of the managed apparatus corresponding to the communication method definition included in the communication method definition information registered in the communication method definition storing unit matches the device type indicated in the registration information registered in the registration information storing unit;

(c) determining, based on the registration information registered in the registration information storing units, an apparatus identifier of a target managed apparatus to which command information is to be transferred;

(d) extracting, from the registration information registered in the registration information storing unit, the device type of the target managed apparatus identified by the apparatus identifier determined in (c), and extracting a communication method definition from the communication method definition information registered in the communication method definition storing unit associated with the registration information storing unit in which the apparatus identifier of the target managed apparatus is registered;

(e) generating the command information based on the device type of the target managed apparatus extracted in (d) and based on the communication method definition extracted in (d), and transferring the command information to the target managed apparatus;

(f) acquiring apparatus information from the target managed apparatus responding to the command information transferred to the target managing apparatus; and (g) transferring the acquired apparatus information to the managing apparatus.

2. The managing system according to claim 1,
wherein the registration information includes information indicating a communication address of the managed apparatus.

3. The managing system according to claim 1,
wherein the managing apparatus transfers information indicating an operation type corresponding to the type of the managed apparatus to the intermediate apparatus, and
the circuitry in the intermediate apparatus acquires the apparatus information at a timing in accordance with the operation type indicated in the information received from the managing apparatus.

4. The managing system according to claim 3,
wherein the operation type indicates a type of an operation of the intermediate apparatus, the type of the operation including at least one of:
acquiring information from the managed apparatus regularly at a predetermined period of time;
acquiring an operating status of the managed apparatus by monitoring the managed apparatus;

adding the managed apparatus as a target to be monitored;

deleting the managed apparatus from the target to be monitored;

discovering the managed apparatus to be monitored in a network; and acquiring identification information of the managed apparatus from the managed apparatus.

5. The managing system according to claim 1, wherein the managing apparatus transfers a first command using a first communication protocol and a second command using a second communication protocol to the intermediate apparatus in accordance with the type of the managed apparatus, and the circuitry in the intermediate apparatus acquires a plurality of items of the apparatus information in response to the first command and the second command in accordance with an operation type indicated in the information received from the managing apparatus.

6. The managing system according to claim 1, wherein the method performed by the circuitry in the intermediate apparatus further comprises:

setting a command as valid or invalid in accordance with the type of the managed apparatus; and acquiring the apparatus information in response to the command being set as valid.

7. The managing system according to claim 1, wherein the managing apparatus transfers the command information and key information to the intermediate apparatus, and the circuitry in the intermediate apparatus extracts a data item specified by the key information as the apparatus information when the circuitry in the intermediate apparatus receives a response, corresponding to the command information, from the managed apparatus.

8. An intermediate apparatus, comprising circuitry to:

(a) register communication method definition information received from a managing apparatus, including one or more communication method definitions for a type of a managed apparatus, in respective communication method definition storing units allocated in a storage device of the intermediate apparatus, and register registration information received from the managing apparatus, including for each registered apparatus amongst one or more managed apparatuses, an apparatus identifier and a device type of the registered apparatus, in respective registration information storing units allocated in the storage device;

(b) associate a communication method definition storing unit with a registration information storing unit, upon determining that the type of the managed apparatus corresponding to the communication method definition included in the communication method definition information registered in the communication method definition storing unit matches the device type indicated in the registration information registered in the registration information storing unit;

(c) determine, based on the registration information registered in the registration information storing units, an apparatus identifier of a target managed apparatus to which command information is to be transferred;

(d) extract from the registration information registered in the registration information storing unit, the device type of the target managed apparatus identified by the apparatus identifier determined in (c), and extract a communication method definition from the communication method definition information registered in the communication method definition storing unit associated with the registration information storing unit in which the apparatus identifier of the target managed apparatus is registered;

(e) generate the command information based on the device type of the target managed apparatus extracted in (d) and based on the communication method definition extracted in (d), and transfer the command information to the target managed apparatus;

(f) acquire apparatus information from the target managed apparatus responding to the command information transferred to the target managing apparatus, the command information corresponding to a type of the managed apparatus; and (g) transfer the acquired apparatus information to the managing apparatus.

9. A method performed by an intermediate apparatus comprising circuitry, the method comprising:

(a) registering communication method definition information received from a managing apparatus, including one or more communication method definitions for a type of a managed apparatus, in respective communication method definition storing units allocated in a storage device of the intermediate apparatus, and registering registration information received from the managing apparatus, including for each registered apparatus amongst one or more managed apparatuses, an apparatus identifier and a device type of the registered apparatus, in respective registration information storing units allocated in the storage device;

(b) associating a communication method definition storing unit with a registration information storing unit, upon determining that the type of the managed apparatus corresponding to the communication method definition included in the communication method definition information registered in the communication method definition storing unit matches the device type indicated in the registration information registered in the registration information storing unit;

(c) determining, based on the registration information registered in the registration information storing units, an apparatus identifier of a target managed apparatus to which command information is to be transferred;

(d) extracting, from the registration information registered in the registration information storing unit, the device type of the target managed apparatus identified by the apparatus identifier determined in (c), and extracting a communication method definition from the communication method definition information registered in the communication method definition storing unit associated with the registration information storing unit in which the apparatus identifier of the target managed apparatus is registered;

(e) generating the command information based on the device type of the target managed apparatus extracted in (d) and based on the communication method definition extracted in (d), and transferring the command information to the target managed apparatus;

(f) acquiring apparatus information from the target managed apparatus responding to the command information transferred to the target managing apparatus, the command information corresponding to a type of the managed apparatus; and (g) transferring the acquired apparatus information to the managing apparatus.

* * * * *